United States Patent
Duluk, Jr. et al.

(10) Patent No.: US 8,085,275 B1
(45) Date of Patent: Dec. 27, 2011

(54) SYSTEM AND METHOD FOR LOW-OVERHEAD PUSH BUFFER JUMPS

(75) Inventors: Jerome F. Duluk, Jr., Palo Alto, CA (US); Paolo E. Sabella, San Francisco, CA (US); Henry Packard Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 961 days.

(21) Appl. No.: 11/314,875

(22) Filed: Dec. 20, 2005

(51) Int. Cl.
*G06F 12/02* (2006.01)
*G09G 5/36* (2006.01)

(52) U.S. Cl. ........................................ 345/565; 345/558

(58) Field of Classification Search .................. 345/558, 345/565
See application file for complete search history.

(56) References Cited

U.S. PATENT DOCUMENTS

| | | | | | |
|---|---|---|---|---|---|
| 4,412,285 | A | * | 10/1983 | Neches et al. | 709/252 |
| 5,185,694 | A | * | 2/1993 | Edenfield et al. | 710/107 |
| 5,325,522 | A | * | 6/1994 | Vaughn | 707/1 |
| 5,574,847 | A | * | 11/1996 | Eckart et al. | 345/505 |
| 5,657,479 | A | * | 8/1997 | Shaw et al. | 345/553 |
| 5,966,142 | A | * | 10/1999 | Harkin | 345/522 |
| 6,148,391 | A | * | 11/2000 | Petrick | 712/202 |
| 6,483,519 | B1 | * | 11/2002 | Long et al. | 345/619 |
| 6,646,639 | B1 | * | 11/2003 | Greene et al. | 345/422 |
| 6,700,582 | B2 | * | 3/2004 | Cheng | 345/531 |
| 2004/0252201 | A1 | * | 12/2004 | Meitav et al. | 348/211.3 |

* cited by examiner

*Primary Examiner* — Aaron M Richer
(74) *Attorney, Agent, or Firm* — Zilka-Kotab, PC (57) ABSTRACT

A push buffer-related system, method and computer program product are provided. Initially, an entry is obtained from a buffer storage describing a size and location of a portion of a push buffer. To this end, the portion of the push buffer is capable of being retrieved, utilizing the entry from the buffer storage.

18 Claims, 8 Drawing Sheets

SYSTEM AND METHOD FOR LOW-OVERHEAD PUSH BUFFER JUMPS

FIELD OF THE INVENTION

The present invention relates to graphics systems, and more particularly to graphics system push buffers.

BACKGROUND

A push buffer is a mechanism for one processor to send data and commands to another processor. For example, in a typical personal computer system with a central processing unit (CPU) and a graphics processing unit (GPU), the CPU writes commands and data into the push buffer and the GPU processes the data and commands in the same order in which they were written. Typically, a dedicated hardware FIFO memory between the CPU and GPU is not appropriate due to the large amount of memory needed for the push buffer. The data in the push buffer typically resides in either the computer's main RAM memory or in the graphics memory attached to the GPU.

Figure 1:
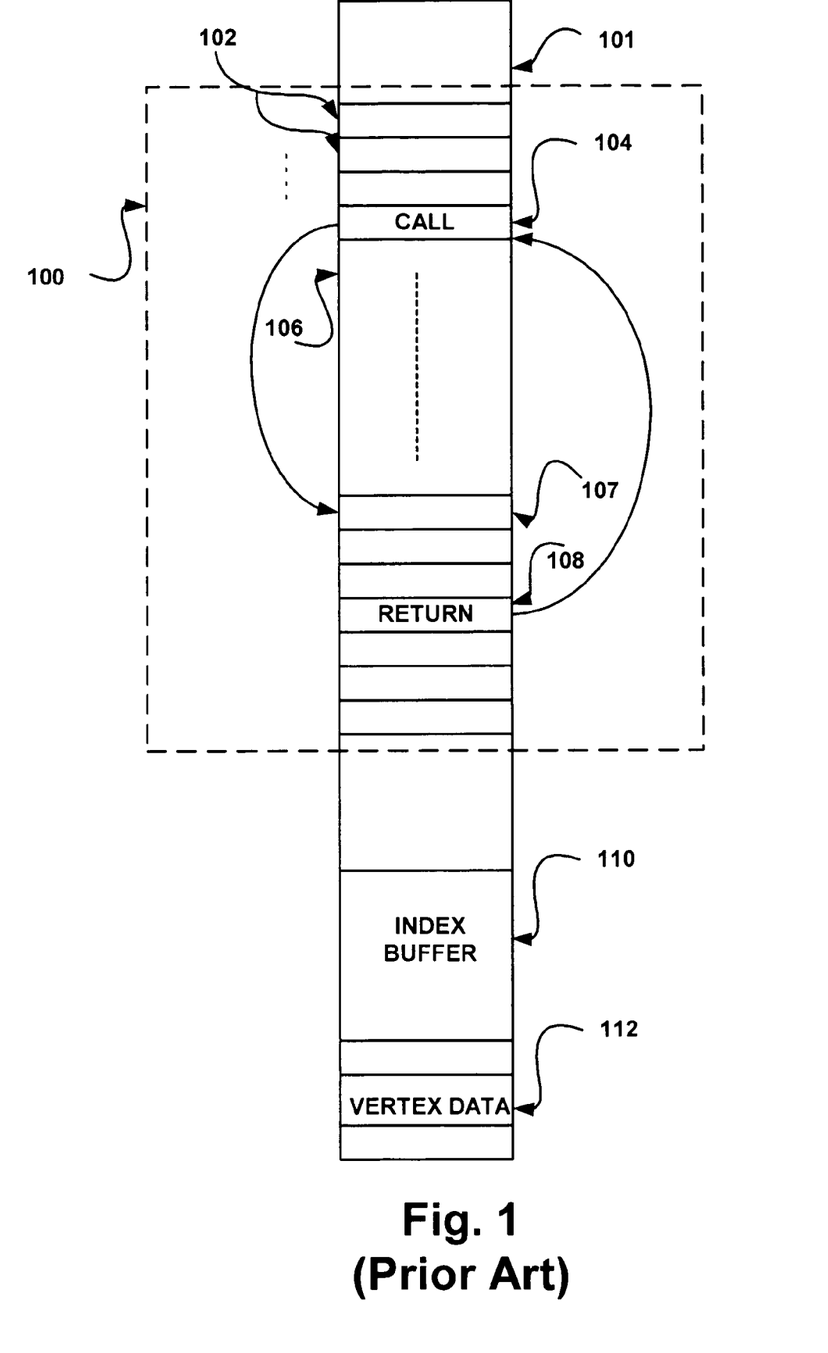
FIG. 1 illustrates a prior art push buffer, in accordance with the prior art.

Prior art FIG. 1 illustrates a prior art push buffer 100, in accordance with the prior art. As shown, the push buffer 100 resides in memory 101 and includes a plurality of portions 102 (e.g. one or more entries, etc.). While not shown, each entry 102 includes a data section and a header section, and may be written by any desired mechanism (e.g. a driver, a first processor, etc.). In the context of the present description, the push buffer 100 may refer to any buffer with a plurality of portions that are capable of being read and executed by another processor (not shown). The portions 102 in the push buffer 100 can be compressed by sharing header sections such that fewer header sections are required.

In use, the prior art push buffer 100 is capable of being written to include various commands. For example, as shown in FIG. 1, a call command 104 may be written such that, when an associated portion 102 of the push buffer 100 is read, the reading processor jumps anywhere (e.g. ahead, etc.) so as to skip a plurality of the portions 102 of the push buffer 100 (note skipped portions 106), and begin reading at the jump destination 107. Still yet, a return command 108 may be reached after reading the desired portion 102, so that operation may continue after the call command 104.

As a performance optimization, the processor prefetches large pieces of the push buffer 100. Unfortunately, the prefetched portions 102 are thrown away after the call command 104, causing wasted memory bandwidth and, therefore, reduced performance. Further, when the processor starts to read from the jump destination 107, undesired "bubbles" in processing occur due to the time it takes to get the portions 102 from the memory 101, thus creating latency issues.

Still yet, the prior art push buffer 100 may be used when conducting index buffer rendering, utilizing an index buffer 110. Typically, during index buffer rendering, the push buffer 100 may be loaded with data of the index buffer 110, namely, the index buffer location in memory, index bit widths, parameters, and a number of associated indices. Thus, the processor may read the data of the index buffer 110 in the push buffer 100.

Thus, in use, the aforementioned data of the index buffer 110 may be used to read indices from memory. With such indices, particular locations may be read within a set of vertex buffers in the push buffer 100. Such vertex buffers may contain various vertex attributes (e.g. position, color, surface normal, texture coordinate, etc.). To this end, the vertex attributes may be sent to a geometry unit for further processing, and then passed further down an associated pipeline, etc.

Unfortunately, an inefficient process is thus provided due to the requirement of a first read operation from the push buffer 100 in order to obtain the information (e.g. index buffer parameters, etc.) necessary to identify the indices which are, in turn, used to perform another read operation for the desired vertex attributes. Such a "two-level" method introduces further undesired latencies.

Alternatively, the indices in the index buffer 110 can be copied into the push buffer 100, but is an undesirable overhead that consumes memory bandwidth and processing time. As another alternative, a push buffer call and return, or two jumps, can be used to make the index buffer 110 behave as if it were copied into the push buffer 100, but this introduces the undesired "bubbles" described above. This further results in indirection and associated latency.

There is thus a need for overcoming these and/or other problems associated with the prior art.

SUMMARY

A push buffer-related system, method and computer program product are provided. Initially, an entry is obtained from a buffer storage describing a size and location of a portion of a push buffer. To this end, the portion of the push buffer is capable of being retrieved, utilizing the entry from the buffer storage.

In one embodiment, the buffer storage entry may include a starting address (i.e. get address) and a length indicator. Still yet, the buffer storage may include a first-in-first-out (FIFO) buffer. In another embodiment, the buffer storage entry may include a get address and an end address.

In another embodiment, the buffer storage may be stored in memory positioned on a semiconductor platform on which a processor resides, such that the processor performs the obtaining and retrieving mentioned hereinabove. In still yet another embodiment, the buffer storage may be stored in memory positioned on a first semiconductor platform separate from a second semiconductor platform on which a processor resides, where, again, the processor performs the aforementioned obtaining and retrieving.

In one aspect of the last-mentioned embodiment, information may be obtained from another buffer describing a location of the buffer storage entry. As an option, such information may include a get address and/or a put address.

As yet another option, the retrieved portion of the push buffer may include a plurality of indices. Various memory may thus be read utilizing the indices.

In yet another embodiment, a result of a test may be identified. In various exemplary embodiments, such test may include a visibility test (e.g. a z-buffer test, etc.), and/or any other desired test for that matter. To this end, the entry of the buffer storage may be conditionally obtained based on the result of the test.

In still yet another embodiment, the retrieved portion of the push buffer may be pre-fetched prior to the processing or decoding of other preceding portions of the push buffer. Further, in use, a plurality of the buffer storage entries in the buffer storage may be processed sequentially in a circular manner.

In various other embodiments, a data structure embodied on a computer readable medium may be utilized. Such data structure may include, for example, a plurality of entries each describing a portion of a push buffer. During use, portions of the push buffer are capable of being retrieved, utilizing the entries.

BRIEF DESCRIPTION OF THE DRAWINGS

Prior art

DETAILED DESCRIPTION

Figure 2A:
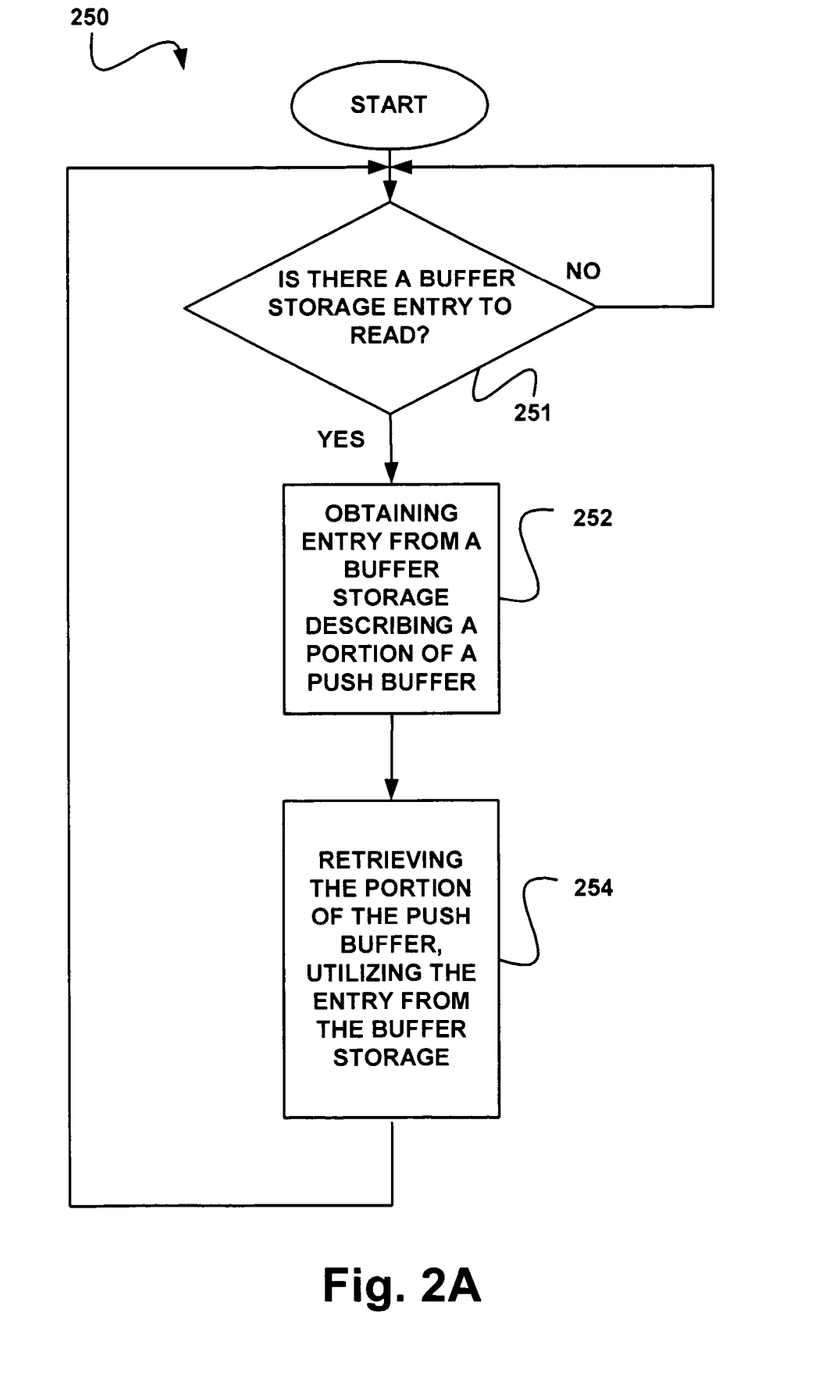
FIG. 2A shows a method for reading a push buffer, in accordance with one embodiment.

FIG. 2A shows a method 250 for reading a push buffer, in accordance with one embodiment. In one embodiment, reading operations are carried out by a processor within a graphics processing unit (GPU). Again, in the context of the present description, the push buffer may refer to any buffer with a plurality of portions (e.g. one or more entries, etc.) that are capable of being read by a processor.

As shown in FIG. 2A, if a buffer storage entry is available for reading per decision 151, such entry is obtained from a buffer storage describing a portion of a push buffer. Note operation 252. In one embodiment, the buffer storage may include a first-in-first-out (FIFO) buffer. Of course, the buffer storage may refer to any buffer situated in any desired location that is capable of storing entries which describe any portion of the push buffer. Still yet, the description may refer to a start location, a length indicator, an end location, and/or any other description that is capable of being used for retrieving the desired portion(s) of the push buffer.

To this end, the desired portion of the push buffer is capable of being retrieved, utilizing the entry from the buffer storage. Note operation 254. A technique is thus provided for more effectively allowing portions of the push buffer to be retrieved when desired.

More illustrative information will now be set forth regarding various optional architectures and features with which the foregoing method 250 may or may not be implemented, per the desires of the user. It should be strongly noted that the following information associated with other embodiments is set forth for illustrative purposes and should not be construed as limiting in any manner. Any of the following features may be optionally incorporated with or without the exclusion of other features described.

Figure 2B:
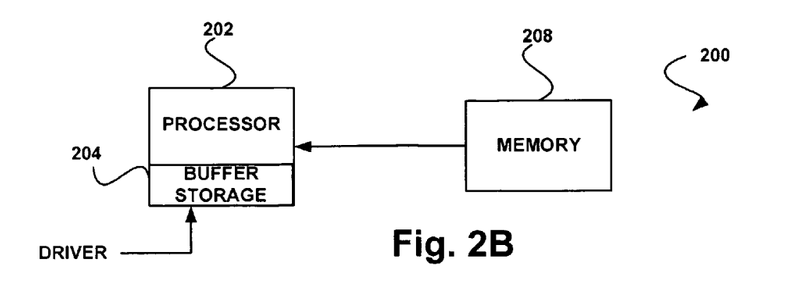
FIG. 2B shows a system for reading a push buffer, in accordance with one embodiment.

FIG. 2B shows a system 200 for reading a push buffer, in accordance with one embodiment. As shown, a buffer storage 204 may be stored in memory that is positioned on a semiconductor platform on which a processor 202 resides. In the present description, such semiconductor platform may refer to a sole unitary semiconductor-based integrated circuit or chip. As further shown, the buffer storage 204 may include various entries including a get address and a length indicator, for reasons that will soon become apparent. Of course, this and/or any other component(s) described herein may exist on or off chip, and may be even be implemented in a multi-chip environment.

In one embodiment, such entries of the buffer storage 204 may be written utilizing a software driver and another processor, such as a central processing unit (CPU) in a personal computer. Specifically, in such embodiment, a first processor [e.g. a central processor unit (CPU), general processor, etc.] may be used to write the entries of the buffer storage 204 such that a second processor [e.g. a graphics processor unit (GPU), two or more GPUs operating in parallel, etc.—see the processor 202] may be used to read the buffer storage 204 and push buffer residing in memory 208. More information regarding one exemplary environment in which the present system may be implemented will be set forth later in greater detail during reference to FIG. 7.

By this construction, the processor 202 may obtain an entry (e.g. a get address, length indictor, etc.) from the buffer storage 204 describing a portion of a push buffer that is stored in the memory 208. As such, the processor 202 may retrieve the described portion of the push buffer, utilizing the entry from the buffer storage 204.

Figure 2C:
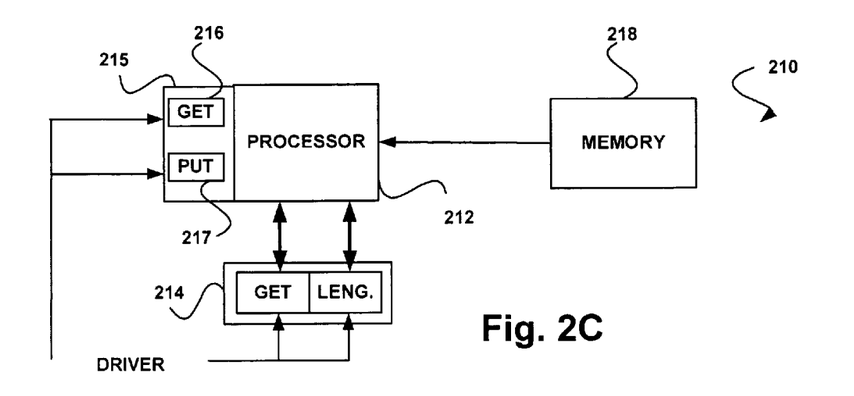
FIG. 2C shows a system for reading a push buffer, in accordance with another embodiment.

FIG. 2C shows a system 210 for reading a push buffer, in accordance with another embodiment. As shown, the present system 210 differs from the previous in that a buffer storage 214 may be stored in memory positioned on a first semiconductor platform separate from a second semiconductor platform on which a processor 212 resides. As further shown, the buffer storage 214 may include a plurality of off-chip entries including a get address and a length indicator which, again, may be written utilizing a driver.

Further, an additional buffer 215 is provided for storing various entries including a get address 216 and a put address 217 (which may also be written utilizing a driver). In use, the get address 216 and put address 217 indicate where the processor 212 should read the buffer storage 214 and how far such read should proceed. In another embodiment, the entries in the additional buffer 216 can include a get address and a length.

To this end, similar to the embodiment of FIG. 2B, the processor 212 may obtain an entry (e.g. a get address, length indictor, etc.) from the buffer storage 214 describing a portion of a push buffer that is stored in memory 218. As such, the processor 212 may retrieve the described portion of the push buffer, utilizing the entry from the buffer storage 214.

Figure 2D:
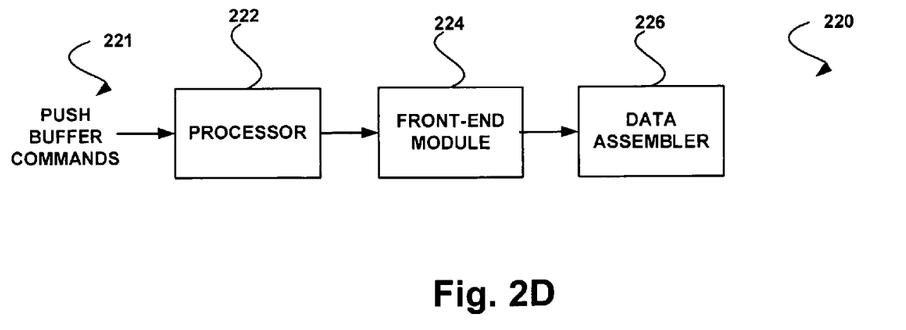
FIG. 2D illustrates a graphics sub-system for use in conjunction a push buffer, in accordance with another embodiment.

FIG. 2D shows a graphics sub-system 220 for use in conjunction with a push buffer, in accordance with another embodiment. As shown, a processor 222 is included for receiving push buffer commands 221 serving to direct the processor 222 in the manner in which various entries of a push buffer are to be read.

Further included is a front-end module 224 in communication with the processor 222. In use, the front-end module 224 is capable of decoding headers of the push buffer entries that the processor 222 reads from the push buffer. Still yet, a data assembler 226 is in communication with the front-end module 224 for receiving decoded push buffer entries and thereby being caused to gather additional data from a memory. In a GPU, the data assembler can gather data associated with one or more vertices associated with an image to be rendered.

Figure 3:
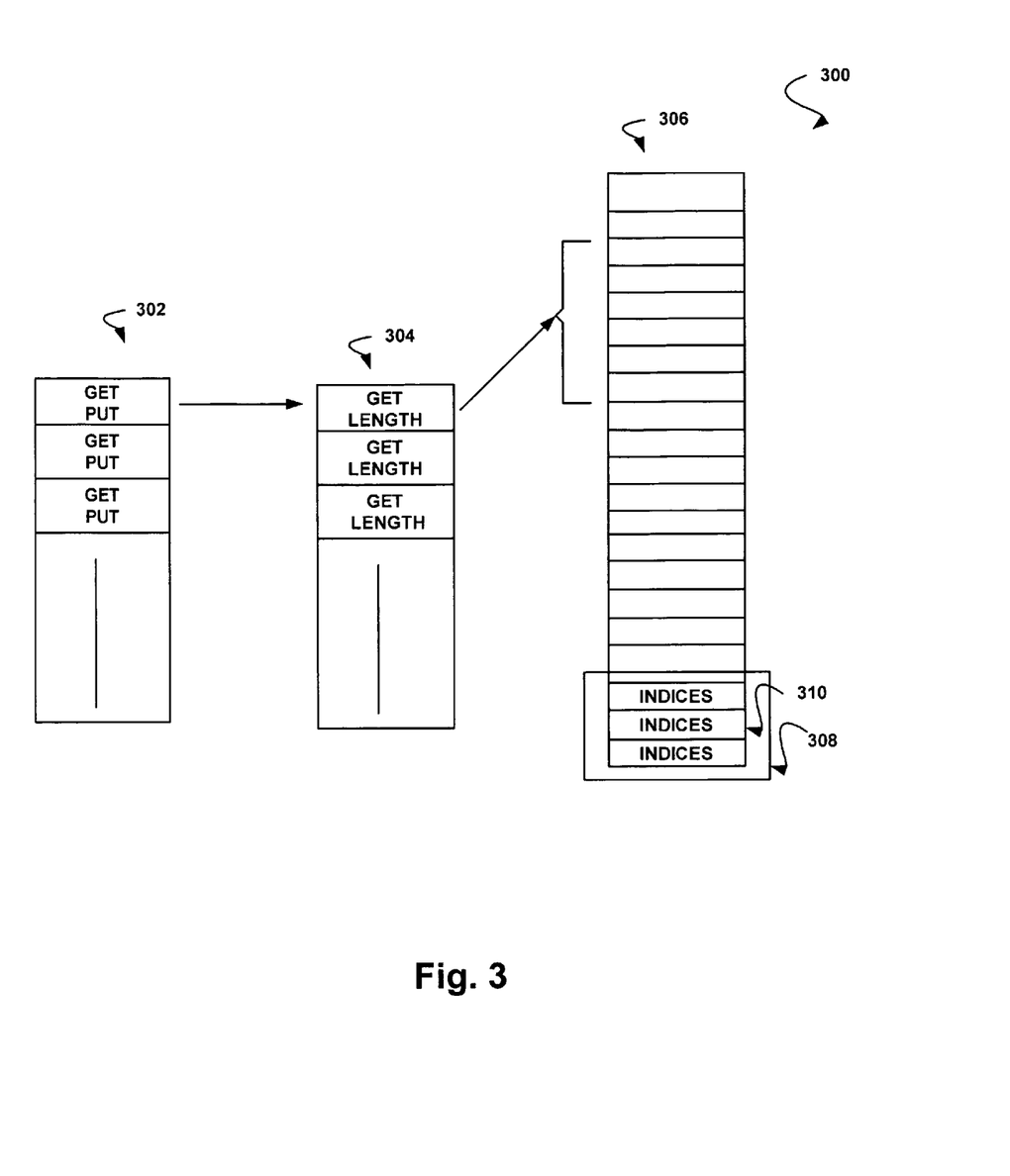
FIG. 3 shows various data structures, in accordance with another embodiment.

FIG. 3 shows various data structures 300, in accordance with another embodiment. In one embodiment, the data structures 300 may be implemented in the context of the systems and methods of FIGS. 1-2C. Of course, however, the data structures 300 may be implemented in any desired context.

As shown, a first buffer 302 may optionally be provided for storing a plurality of get and put addresses for directing a processor in the manner in which get address and length indictor entries are retrieved from a second buffer 304. These get address and length indictor entries from the second buffer 304, in turn, describe a portion of a push buffer 306 that are to be retrieved. As noted earlier, the second buffer 304 may be used with the exclusion of the first buffer 302 (e.g. see FIG. 2B, for example). Of course, any desired number of buffer entries may be utilized as desired. Such number may, in various embodiments, depend on a size of associated display lists that are input, as well as how far a driver gets ahead of push buffer reads by the processor.

In some embodiments, the first buffer 302 is stored in the additional buffer 215, the second buffer 304 is stored in the buffer storage 214, and the push buffer 306 is stored in the memory 218 (e.g. see FIG. 2B, for example). In some embodiments, the first buffer 302 is a get/put (GP) first-in-first-out (FIFO) buffer, which is described later.

Still yet, as in the prior art push buffer 100 of FIG. 1, an index buffer 308 may be stored in the push buffer 306. The index buffer 308 includes a plurality of indices 310.

To facilitate processing of the data retrieved from the push buffer, the header associated with each push buffer entry may include various information. For example, the header may include an indictor as to whether the associated data includes the aforementioned index buffer 308 or indices 310. Further, in the case where the indices 310 are present, the header may further indicate a number of such indices 310, etc.

The header may take on any desired size. Strictly as an option, the header may even be augmented (e.g. double-word, etc.) to accommodate a larger number of such indices. Further, an additional indicator may be provided in the header for indicating whether the header is augmented in this fashion or not. Even still, a condition code may be associated with a header or a push buffer portion for indicating a result of a visibility test, for reasons that will be set forth hereinafter in greater detail.

Figure 4:
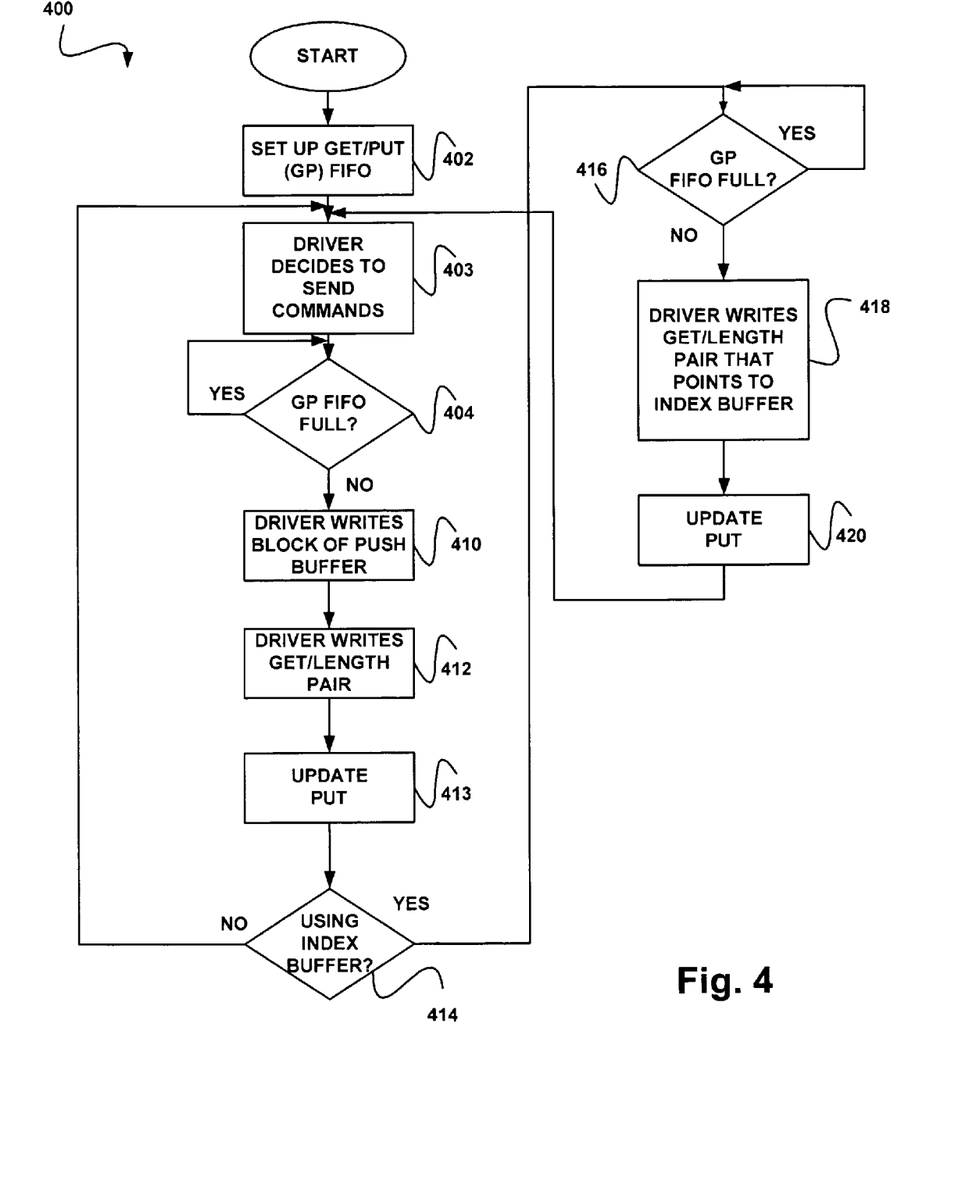
FIG. 4 shows a method for writing a push buffer, in accordance with one embodiment.
Figure 5:
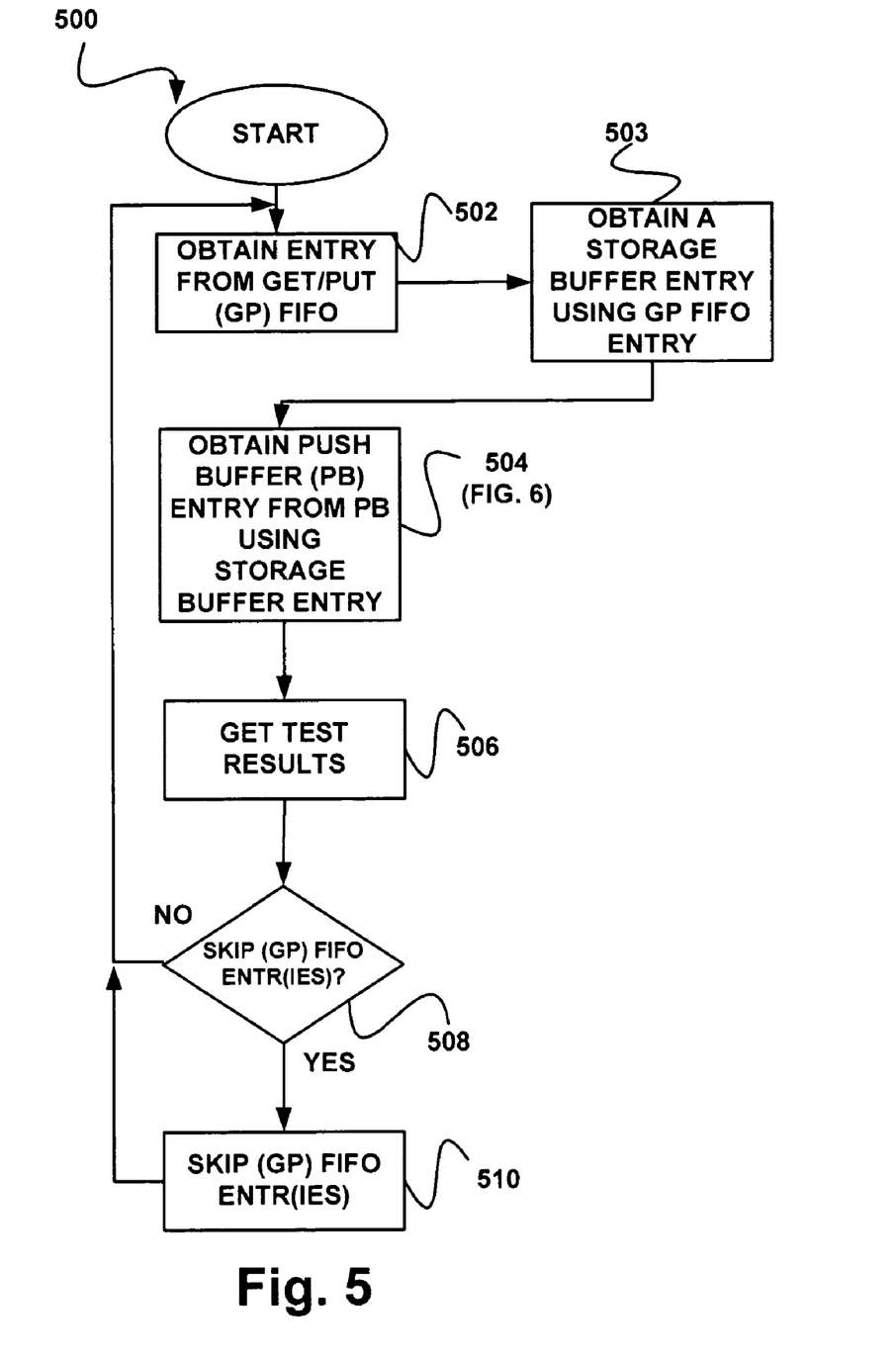
FIG. 5 illustrates a method for reading a push buffer, in accordance with another embodiment.
Figure 6:
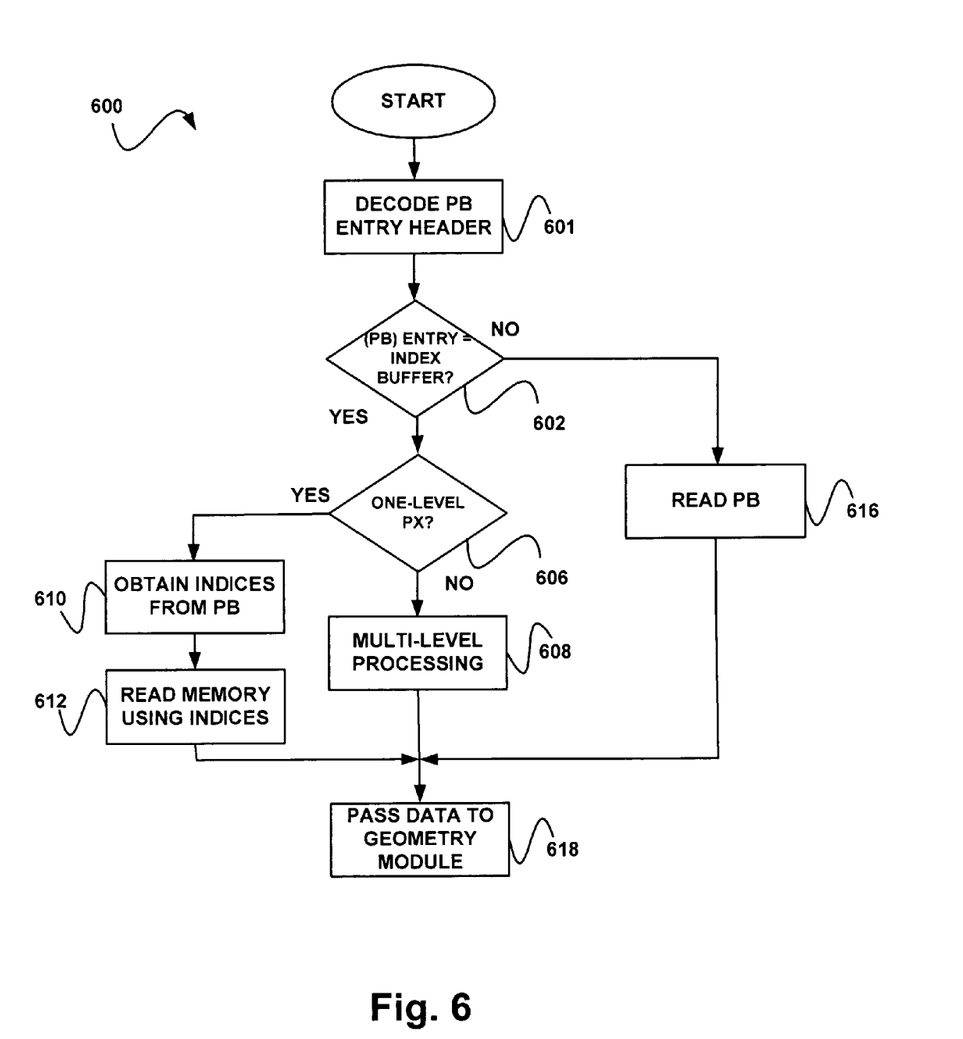
FIG. 6 illustrates a method for processing a push buffer entry, in accordance with another embodiment.

More exemplary information will now be set forth regarding the manner in which such buffers are written by a driver (see FIG. 4), as well as the manner in which the push buffer is read (see FIGS. 5-6).

FIG. 4 shows a method 400 for writing a push buffer, in accordance with one embodiment. As an option, the method 400 may be implemented in the context of the systems and methods of FIGS. 1-3 (and particularly the system of FIG. 2C). Of course, however, the method 400 may be implemented in any desired context.

As shown, a get/put (GP) first-in-first-out (FIFO) buffer (e.g. see, for example, the buffer 302 of FIG. 3, etc.) is set up, as indicated in operation 402. Once the GP FIFO is set up and a driver decides to send push buffer commands to a processor (note operation 403), it is then determined whether the GP FIFO is full in decision 404. If so, the present method 400 stalls, as available space in the GP FIFO may be required.

On the other hand, if it is determined that the GP FIFO is not full, the driver writes a portion of the push buffer (e.g. see, for example, the push buffer 306 of FIG. 3, etc.) in operation 410. Further, in operation 412, the driver writes a get address and length indictor pair in another buffer (e.g. see, for example, the buffer 304 of FIG. 3, etc.), for describing a location of the written portion of the push buffer. Still yet, a push address of the GP FIFO is updated in operation 413 for identifying a location of the get address/length indictor pair.

Still yet, it is determined in decision 414 whether an index buffer is being utilized in conjunction with the commands being sent in the previous invocation of operation 403. If not, the method 400 proceeds to a new operation 403, and so on. However, if it is determined in decision 414 that an index buffer is being utilized, it is again determined whether the GP FIFO is full in decision 416. If not, the driver writes a get address and length indictor pair that points to the index buffer, for reasons that will soon become apparent. Again, the put address of the GP FIFO is updated in operation 420.

Occasionally, updating the put address in either operation 413 or operation 420 is replaced by generating an entirely new get/put pair and storing it into the GP FIFO (e.g. see, for example, the buffer 302 of FIG. 3, etc.). This is done whenever the get/length pair stored (see operation 412 and operation 418) into a storage buffer (e.g. see, for example, the buffer 304 of FIG. 3, etc.) is not at the next sequential address in the storage buffer. That is, updating the put address effectively appends an entry to the storage buffer at the next storage buffer address; while a new get/put pair can locate a storage buffer entry anywhere in the storage buffer, and may even include an address location previously unused as part of the storage buffer, thereby increasing the effective size of the storage buffer.

FIG. 5 illustrates a method 500 for reading a push buffer, in accordance with one embodiment. Optionally, the method 500 may be implemented in the context of the systems and methods of FIGS. 1-4. Of course, however, the method 500 may be implemented in any desired context.

As shown, an entry is retrieved from the GP FIFO in operation 502. As mentioned earlier, such entry may be used to indicate which storage buffer entry is next. In operation 503, the GP FIFO entry is used to read a storage buffer entry. The storage buffer entry is used for pointing to a particular portion of the push buffer. To this end, the appropriate push buffer entry may be obtained from the push buffer for processing by the appropriate modules (e.g. see, for example, the front-end module 224 and the data assembler 226 of FIG. 2D, etc.). More information regarding such processing will be set forth in greater detail during reference to FIG. 6.

Optionally, test results are obtained in operation 506. In various exemplary embodiments, such test may include a visibility test (e.g. a z-buffer test, occlusion query, etc.), and/or any other desired test for that matter. In one embodiment, this may be accomplished by utilizing information (e.g. condition code, etc.) obtained as a result of header decoding. Note the aforementioned description of such header during reference to FIG. 3.

For example, in a personal computer with a CPU and GPU, push buffer entries can describe the size and location of a visibility test volume within a virtual 3D space being rendered by the GPU. Typically, a visibility test volume is associated with more complex geometry that resides within the volume. If any part of the visibility test volume is visible in the 3D space, the complex geometry is rendered by processing the push buffer entries that correspond to the complex geometry. However, if the visibility test volume is completely hidden, the complex geometry would also be completely hidden, and therefore, does not need to be rendered. The rendering of complex geometry is skipped by skipping the push buffer entries that correspond to the complex geometry.

The foregoing visibility test may, in one embodiment, involve the determination of a z-direction depth of a surface to identify a closest (visible) surface. An exemplary visibility test is set forth in Table 1. Of course, it should be understood that the algorithm of Table 1 is set forth for illustrative purposes only and should not to be construed as limiting in any manner, as any test (even a non-visibility-related test, for that matter) may be employed.

TABLE 1

```
for each polygon P
    for each pixel (x, y) in P
        compute z_depth at x, y
        if z_depth < z_buffer (x, y) then
            set_pixel (x, y, color)
            z_buffer (x, y) <= z_depth
```

Thus, an entry of the GP FIFO may be conditionally obtained based on the result of the test. In particular, in decision 508, it may be determined whether a particular one or more entries of the GP FIFO are to be skipped in operation 510, due to the fact that the associated push buffer entries contain hidden graphics data. It should be noted that the test results may be stored in any desired location and further be stored at any desired time (e.g. after processing of each portion of the push buffer, etc.). By this feature, undesired processing is avoided in operation 504, and the retrieved portion of the push buffer may be pre-fetched prior to a plurality of other preceding portions of the push buffer.

FIG. 6 illustrates a method 600 for processing a push buffer entry, in accordance with another embodiment. In one embodiment, the method 600 may be implemented in the context of the systems and methods of FIGS. 1-6 and, in particular, in the context of operation 504 of FIG. 5. Of course, however, the method 600 may be implemented in any desired environment.

As shown, a header of the push buffer entry is decoded in operation 601. Of course, this may be carried out by any desired module (e.g. see, for example, the processor 222, front-end module 224 of FIG. 2D, etc.). Next, it is determined whether the push buffer entry contains an index buffer. Note decision 602. In one embodiment, this may be accomplished by utilizing information obtained as a result of the header decoding.

If it is determined that the push buffer entry contains an index buffer, it is then determined whether one-level, "in-line," processing is to be carried out in decision 606. Again, this decision may be carried out by utilizing information obtained as a result of the header decoding. If one-level processing is desired, a jump is made so that indices (e.g. see, for example, the indices 310 of FIG. 3, etc.) are retrieved directly from the push buffer in operation 610. Such indices may then be used to read from memory data associated with particular vertices. In some embodiments, the jump is performed by placing an entry into buffer storage (e.g. see, for example, the buffer 304 of FIG. 3, etc.). Note operation 612. Of course, such vertex-related data may be read and processed by any desired module (e.g. see, for example, the data assembler 226 of FIG. 2D, etc.).

To this end, a "bubble" is avoided, since storage buffer entries can be processed in order and provide for prefetching push buffer portions without fetching data that is not needed. Of course, however, based on decision 606, a traditional two-level query (e.g. see, for example, prior art FIG. 1 and the description thereof) may still be carried out in operation 608.

Referring back to decision 602, if it is determined that the push buffer entry does not contains an index buffer, the desired data is directly read from the push buffer. Note operation 616. To this end the data retrieved from push buffer may be processed by an appropriate module and further passed downstream to a geometry module for associated transformation, lighting, etc. For a processor (e.g. see, for example, the processor 222 in FIG. 2D) that is reading push buffer entries, operation 610 and operation 616 can be treated identically, since those operations simply read the entries from the push buffer and send them to the next module (e.g. see, for example, the front-end module 224 in FIG. 2D) for decoding. Hence, for a processor reading push buffer entries, decision 602 and decision 606 do not alter the processor's behavior, since the processor just uses the next buffer storage entry to get the next portion of push buffer.

Thus, a plurality of get/put address pairs may be rotated through in sequence for obtaining data entries from a push buffer. When the processor is using a particular get/put address pair for retrieval purposes, such pair may serve as a present configuration, in that the put address may be overwritten by the driver when data is added to a corresponding buffer area in system memory. When the driver initiates a push buffer jump, it may simply write both a get address and a put address to the next get/put address pair, indicating a new buffer area in system memory which may be read.

Therefore, "low/no-overhead" jumps may optionally be carried out in the push buffer without the call/return commands and associated latency problems of the prior art. In addition to not reading data which is thrown away, the processor may look ahead in the GP FIFO to set up the next memory access, thereby keeping the associated process pipelined, thereby optionally avoiding the "bubbles" of the prior art. Of course, these features are optional, as it is contemplated that, in various embodiments, the different techniques disclosed herein may be carried out with the call/return commands and, to some extent, the associated "bubbles."

By this feature, in one optional embodiment, it may be feasible to use a small static random access memory (SRAM) as a "pseudo-FIFO," since the process may look at a current and next get/put address pair and write to an end of the get/put address pair sequence. Of course, various embodiments may support multiple next get/put address pairs in flight, etc. To accomplish this, the present embodiment may employ a FIFO which is capable of overwriting a last entry.

Figure 7:
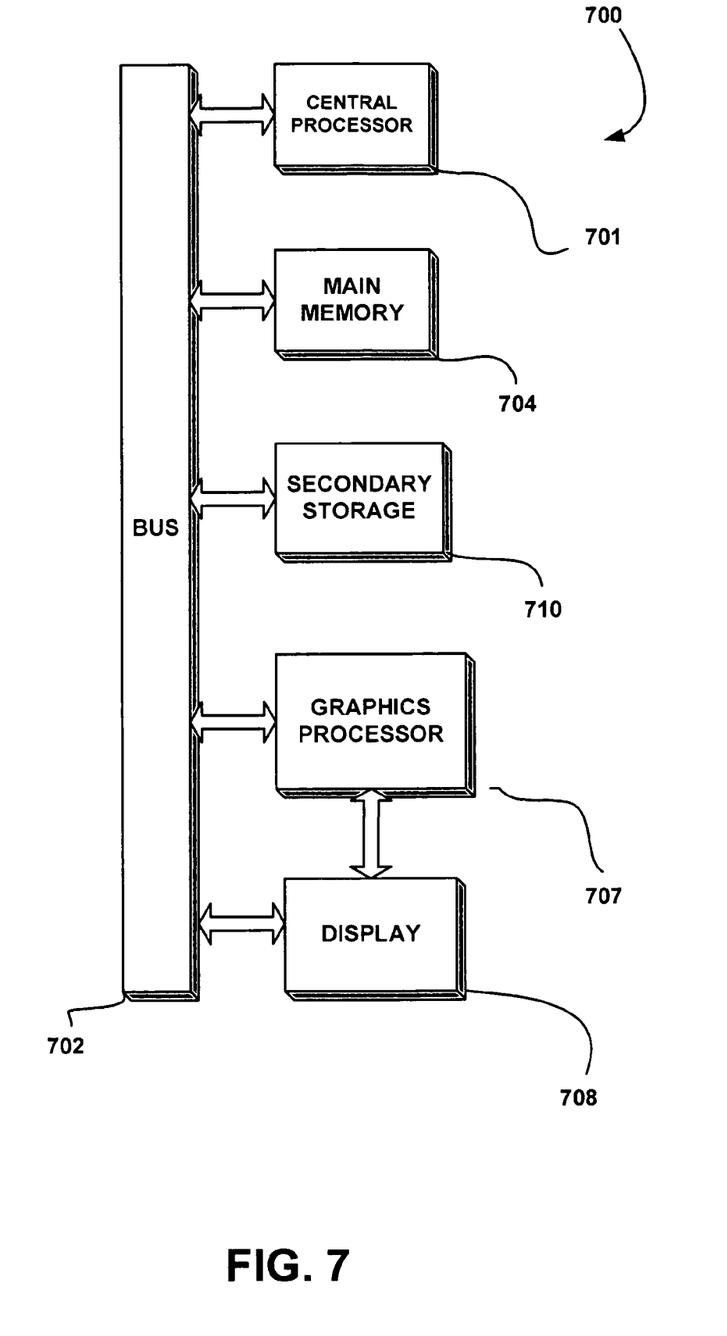
FIG. 7 illustrates an exemplary computer system in which the various architecture and/or functionality of the various previous embodiments may be implemented.

FIG. 7 illustrates an exemplary computer system 700 in which the various architecture and/or functionality of the various previous embodiments may be implemented. As shown, a computer system 700 is provided including at least one host processor 701 which is connected to a communication bus 702. The computer system 700 also includes a main memory 704. Control logic (software) and data are stored in the main memory 704 which may take the form of random access memory (RAM).

The computer system 700 also includes a graphics processor 706 and a display 708, i.e. a computer monitor. In one embodiment, the graphics processor 706 may include a transform module, a lighting module, and a rasterization module. Each of the foregoing modules may even be situated on a single semiconductor platform to form a graphics processing unit (GPU).

The computer system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the computer system 700 to perform various functions.

Memory 704, storage 710 and/or any other storage are possible examples of computer-readable media.

In one embodiment, the architecture and/or functionality of the various previous figures may be implemented in the context of the host processor 701, graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   identifying a result of a test;
   obtaining an entry describing a portion of a push buffer from a buffer storage; and
   retrieving the portion of the push buffer, utilizing the entry from the buffer storage;
   wherein a processor performs the obtaining and the retrieving;
   wherein the entry of the buffer storage is conditionally obtained based on the result of the test;
   wherein information describing a location of the entry is obtained from another buffer;
   wherein the entry is obtained using the information obtained from the other buffer that describes the location of the entry;
   wherein a plurality of entries is utilized for retrieving the portion of the push buffer, a number of the entries dependent on a size of an inputted display list and an amount in which a driver is ahead of push buffer reads by the processor.

2. The method of claim 1, wherein the entry includes a get address.

3. The method of claim 1, wherein the entry includes a length indicator.

4. The method of claim 1, wherein the buffer storage is a first-in-first-out (FIFO) buffer.

5. The method of claim 1, wherein the buffer storage is stored in memory positioned on a semiconductor platform on which the processor resides.

6. The method of claim 1, wherein the buffer storage is stored in memory positioned on a first semiconductor platform separate from a second semiconductor platform on which the processor resides.

7. The method of claim 1, wherein the information includes a get address.

8. The method of claim 1, wherein the information includes a put address.

9. The method of claim 1, wherein the retrieved portion of the push buffer includes a plurality of indices.

10. The method of claim 9, further comprising reading memory utilizing the indices.

11. The method of claim 1, wherein the test includes a visibility test.

12. The method of claim 11, wherein the visibility test includes a z-buffer test.

13. The method of claim 1, wherein the retrieved portion of the push buffer is pre-fetched prior to a plurality of other preceding portions of the push buffer.

14. The method of claim 1, wherein the plurality of the entries are processed sequentially in a circular manner.

15. The method as recited in claim 1, wherein the entry is written utilizing the driver and the processor.

16. The method as recited in claim 1, wherein the other buffer stores a plurality of get and put addresses that direct the processor how get address and length indicator entries are retrieved from the buffer storage, where the get address and length indicator entries from the buffer storage describe the portion of the push buffer that is to be retrieved.

17. A system, comprising:
    a push buffer;
    a buffer storage including a plurality of entries each describing a portion of the push buffer;
    another buffer storage including information describing a location of each of the entries; and
    a processor for retrieving portions of the push buffer, utilizing the entries;
    wherein the entries of the buffer storage are conditionally obtained by the processor based on a result of a test;
    wherein the entry is obtained by the processor using the information obtained from the other buffer that describes the location of the entry;
    wherein a number of the plurality of entries is dependent on a size of an inputted display list and an amount in which a driver is ahead of push buffer reads by the processor.

18. The system as recited in claim 17, wherein further included is a bus, and a display in communication with the bus, where the processor remains in communication with the display via the bus.

* * * * *